United States Patent [19]

Spammer et al.

[11] Patent Number: 5,289,259
[45] Date of Patent: Feb. 22, 1994

[54] APPARATUS FOR EXTRACTING A VARIABLE FROM TWO QUADRATURE SIGNALS BEING FUNCTIONS OF THE VARIABLE

[75] Inventors: Stephanus J. Spammer, Florida Park; Pieter L. Swart, Quellerina, both of South Africa

[73] Assignee: Rand Afrikaans University, Johannesburg, South Africa

[21] Appl. No.: 927,112

[22] Filed: Aug. 7, 1992

[30] Foreign Application Priority Data

Aug. 8, 1991 [ZA] South Africa ............... 91/6263

[51] Int. Cl.$^5$ ............... G01C 19/64; H03D 1/00
[52] U.S. Cl. ............... 356/350; 328/133
[58] Field of Search ............... 356/350; 307/498, 529; 328/133, 161

[56] References Cited

PUBLICATIONS

Electronic letter vol. 26, No. 16 of Aug. 2, 1990, pp. 1251–1252, Kersey et al.

Primary Examiner—Vincent P. McGraw
Attorney, Agent, or Firm—Merchant & Gould, Smith, Edell, Welter & Schmidt

[57] ABSTRACT

Apparatus 200 for extracting a variable from two quadrature signals which are functions of the variable is disclosed and claimed. The apparatus is particularly suitable for use with a minimum configuration open-loop fiber optic gyroscope 100 to provide a signal ($V_{out}$) proportional to the Sagnac phase shift, which is proportional to the rotation rate $\Omega$ of fiber loop 20. The apparatus comprises a trigonometric transformation circuit 30, a dynamic control circuit 32, a feedback loop 33, an adder and a feedforward loop 32.1. The adder, in use, adding an output signal of the dynamic control circuit and a signal in the feedforward loop to provide the signal ($V_{out}$), with improved dynamic response. The apparatus also comprises a reset circuit 34 for extending the angular range of the apparatus. An adaptive reset circuit for improving the dynamic range of the apparatus is also disclosed.

11 Claims, 7 Drawing Sheets

IMPLEMENTATION OF T2

IMPLEMENTATION OF T3

IMPLEMENTATION OF T4

IMPLEMENTATION OF T5

RESET CIRCUIT

ADAPTIVE RESET CIRCUIT

APPARATUS FOR EXTRACTING A VARIABLE FROM TWO QUADRATURE SIGNALS BEING FUNCTIONS OF THE VARIABLE

INTRODUCTION AND BACKGROUND

This invention relates to apparatus for providing from two quadrature input signals, which each is a function of a variable, a signal proportional to the variable. The invention also relates to an open-loop fiber optic gyroscope system comprising such apparatus for providing a signal proportional to the so-called Sagnac phase shift.

An open-loop fiber optic gyroscope with electronic closed-loop "phase shift nulling"-type electronic signal processing to perform analogue phase tracking or extraction is disclosed in a letter by A. D. Kersey and R. P. Moeller published in ELECTRONIC LETTERS Vol 26, No. 16 of Aug. 2, 1990 on page 1251. In the system disclosed, two quadrature signals derived from the open-loop fiber optic gyroscope and which are functions of the Sagnac phase shift, are fed to a trigonometric transformation circuit. An input of a first order dynamic control circuit comprising an integrator is connected to the trigonometric transformation circuit. The system output, which is proportional to the Sagnac phase shift to be extracted, is provided at an output of the dynamic control circuit. A feedback loop is provided between the dynamic control circuit and the trigonometric transformation circuit.

The aforementioned system has been found to have unsatisfactory ramp and step responses. Furthermore, because the trigonometric transformation circuit comprises commercially available analogue trigonometric function generators with a limited operational signal range (typically about ±540 degrees), the maximum detectable rotation rate of the system is limited. For example, for a system with a gyroscope with a scale factor of $\phi/\Omega=10$ s, the maximum detectable rotation rate is about ±54°/s.

OBJECT OF THE INVENTION

Accordingly it is an object of the present invention to provide apparatus with which the applicant believes the aforementioned disadvantages will at least be alleviated.

SUMMARY OF INVENTION

According to the invention there is provided apparatus for providing from two quadrature input signals, which each is a function of a variable, an output proportional to the variable, the apparatus comprising:
  trigonometric transformation means for receiving two quadrature input signals;
  dynamic control means for acting on an output generated by the trigonometric transformation means, the trigonometric transformation means and dynamic control means, in use, co-operating to linearize the two quadrature input signals;
  feedback means provided between said dynamic control means and said trigonometric transformation means;
  adder means; and
  feedforward means provided between said trigonometric transformation means and said adder means;
  the adder means, in use, adding an output generated by the dynamic control means and an output of said feedforward means to provide an output which is proportional to said variable.

The dynamic control means may be a first order control means comprising a single integrator means.

Further according to the invention synchronous detection means may be provided for providing said quadrature input signals to the trigonometric transformation means.

The trigonometric transformation means may comprise at least one analogue trigonometric function generator. Some of the presently known trigonometric function generators have a limited angular input range, typically ±3π. To increase the angular range of apparatus according to the invention, comprising such generators, there is provided in the feedback means reset means having input means and an output means, the input means, in use, receiving said output generated by said dynamic control means and said output means of said reset means being connectable to said at least one trigonometric function generator in the trigonometric transformation means, the function generator, being adapted to generate a periodic trigonometric function with a fixed period, the reset circuit being operative to reset said output generated by the dynamic control means by subtracting values representative of multiples of said fixed period from said output generated by said dynamic control means, thereby to map said output generated by said dynamic control means within a predetermined limited range falling within the input range of said at least one trigonometric function generator.

The reset means may comprise a n-bit analogue to digital (A/D) converter having analogue input means and digital output means comprising n bits; and a at least m-bit digital to analogue (D/A) converter having digital input means comprising at least m bits and analogue output means, the at least m bits of the digital input means of said D/A converter being connected to m least significant bits of the output means of said A/D converter; and wherein m<n.

In an adaptive reset circuit a by-pass loop may be provided between the analogue input means of the A/D converter and a first terminal of a switch, a second terminal of the switch being connected to said output means of the D/A converter; a controller, connected to n-m most significant bits of said output means of said A/D converter, may be provided to cause the switch selectively to connect either said first terminal or said second terminal of the switch to said output of said reset means, thereby selectively to bypass the converters for signals from the dynamic control means falling within the input range of said at least one trigonometric function generator.

In a preferred embodiment there is provided apparatus according to the invention wherein the trigonometric transformation means comprises a trigonometric transformation circuit having at least first and second input means for receiving the two quadrature input signals and an output means; wherein the dynamic control means comprises a dynamic control circuit connected to the output means of the trigonometric transformation circuit; wherein the feedback means comprises a feedback loop extending from an output means of the dynamic control circuit to a third input means of the trigonometric transformation circuit; wherein the adder means comprises first and second input means and an output means; wherein the feedforward means comprises an input means and an output means, said input means of said feedforward means being connected to said output means of said trigonometric transformation circuit and said output means of said feedforward means being connected to said first input means of said adder means, said second input means of said adder means being connected to said output means of said dynamic control circuit so that, in use, said output proportional to said variable is provided at said output means of said adder means.

Also included within the scope of the present invention is an open-loop fiber optic gyroscope system comprising a minimum configuration open-loop fiber optic gyroscope and apparatus as hereabove defined connected to an output photodetector of the minimum configuration open-loop fiber optic gyroscope to provide an output proportional to the so-called Sagnac phase shift.

In this specification the term "minimum configuration open-loop fiber optic gyroscope" is used to denote a light source connected to one port of a first optical fiber coupler, a fiber polarizer connected to a second port of the first optical coupler, one output of the polarizer being connected to a first port of a second optical fiber coupler, a second port of the second optical fiber coupler being connected to a first end of a fiber coil, a second end of the coil being connected via a fiber phase modulator to a third port of said second optical fiber coupler and the output photodetector being connected to a third port of said first optical fiber coupler.

BRIEF DESCRIPTION OF THE DRAWINGS

The invention will now further be described, by way of example only, with reference to the accompanying diagrams wherein.

DESCRIPTION OF PREFERRED EMBODIMENT OF THE INVENTION

Figure 1:
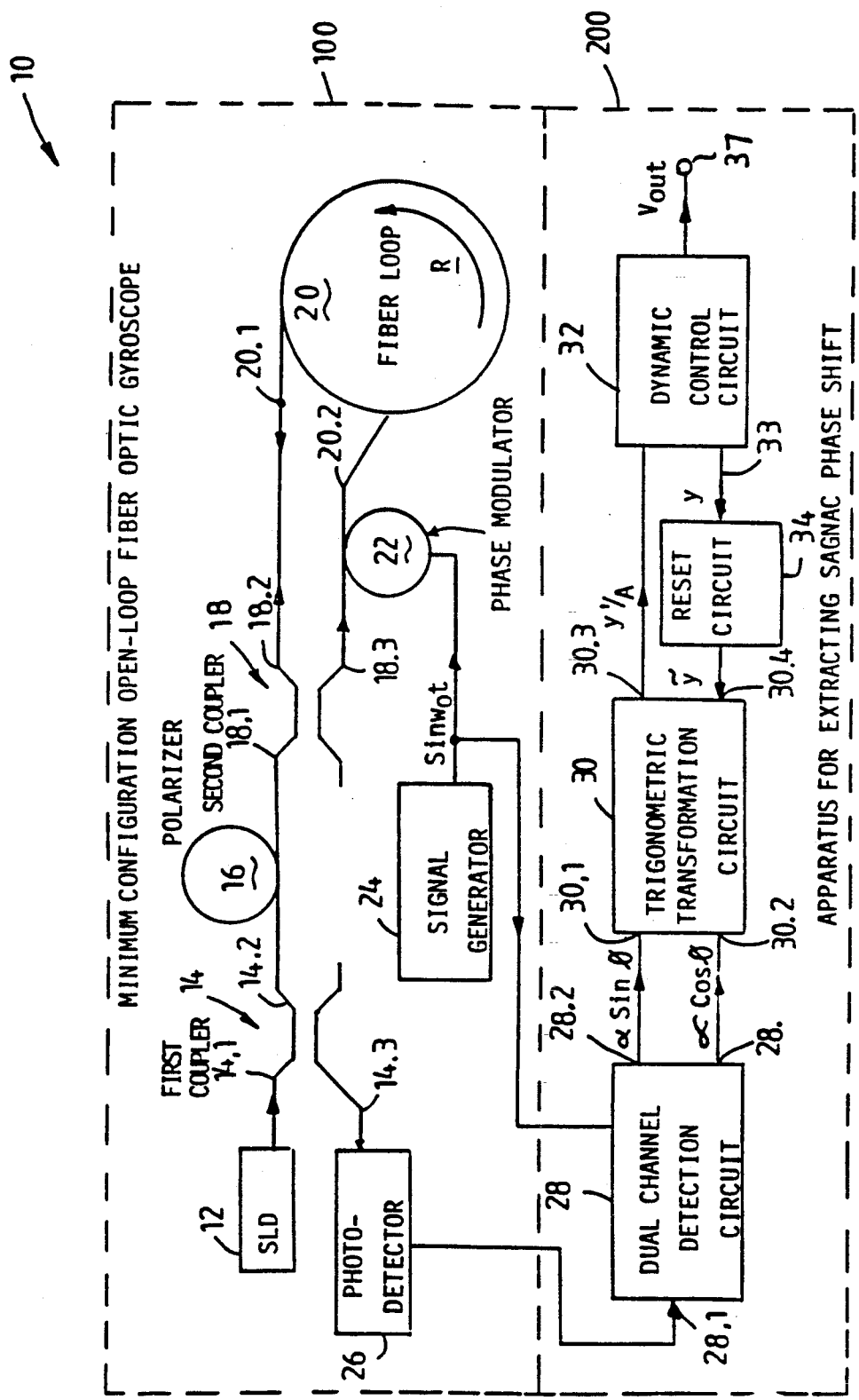
FIG. 1 is a block diagram of an open-loop fiber optic gyroscope system according to the invention comprising a minimum configuration open-loop fiber optic gyroscope and apparatus according to the invention for extracting the so-called Sagnac phase shift from two quadrature input signals, which each is a function of the phase shift.

An open-loop fiber optic gyroscope system according to the invention is generally designated by the reference numeral 10 in FIG. 1.

The gyroscope system 10 comprises a minimum configuration open-loop fiber optic gyroscope 100 and apparatus 200 according to the invention for extracting a variable, such as the so-called Sagnac phase shift $\phi$, from two quadrature input signals, which each is a function of the variable.

The minimum configuration open-loop fiber optic gyroscope 100 comprises a light source, preferably a super-luminescent diode (SLD) 12 connected to one port 14.1 of a first 3 dB optical fiber coupler 14. A second port 14.2 of the coupler 14 is connected to a fiber polarizer 16. The output of the polarizer is connected to a first port 18.1 of a second 3 dB optical fiber coupler 18. A second port 18.2 of the second coupler 18 is connected at one end 20.1 of a length of fiber, typically hundreds or even thousands of meters in length, wound in a coil 20 having a diameter of typically in the order of 0.1 m. A third port 18.3 of the second coupler 18 is connected to the other end 20.2 of the coil. Between the third port 18.3 of the second coupler and the other end 20.2 of the coil there is provided a phase modulator in the form of a piezoelectric fiber stretcher 22. The phase modulator is driven in well known manner by a signal generator 24 providing a signal, $\sin w_0 t$. A third port 14.3 of the first coupler 14 is connected to an input of an output photodetector 26.

The apparatus 200 comprises a dual channel synchronous detection circuit 28 having an input 28.1 connected to an output of the photodetector 26 to yield quadrature signals $\sin\phi$ and $\cos\phi$, at outputs 28.2 and 28.3 thereof and which are functions of the Sagnac phase shift $\phi$ and which will be referred to more fully hereinafter.

The outputs 28.2 and 28.3 of synchronous detection circuit 28 is connected to two inputs 30.1 and 30.2 respectively of a trigonometric transformation circuit 30. An output 30.3 of the trigonometric transformation circuit is connected to first order dynamic control circuit 32 comprising a single integrator. As best shown in FIGS. 3 to 7, there is provided a feedforward loop 32.1. A feedback loop 33 is provided from the control circuit 32 to a third input 30.4 of the trigonometric transformation circuit 30. A first input 35.1 of an adder 35 is connected to an output of the feedforward loop 32.1 and a second input 35.2 of the adder is connected to an output 32.2 of the control circuit. An output 35.3 of the adder 35 is connected to the system output 37.

In the feedback loop 33 there is provided a reset circuit 34 to compensate for the limited angular range of commercially available analogue trigonometric function generators (not shown in FIG. 1, but in FIGS. 3 to 7) used in the trigonometric transformation circuit 30.

The system according to the invention yields at system output 37 a signal $V_{out}$ equal to $\phi$, the Sagnac phase shift caused by rotation of the coil 20, with improved angular range and ramp and step responses, when compared to the systems presently known in the art.

The operation of the system according to the invention will now be described with reference to the figures.

Referring to FIG. 1, it is known that upon rotation of coil 20 in the direction indicated by the arrow R, the so-called Sagnac phase shift $\phi$ is caused between two counter propagating waves in the coil 20 originating from source 12 and launched into the coil at the ports 18.2 and 18.3 of the second coupler 18. This Sagnac phase shift $\phi$ is directly proportional to the rotation rate $\Omega$ of the coil 20.

As a result of the operation of the phase modulator 22, the current at the output of the photodetector 26 is in the form:

$$I\alpha P_{in}(1+J_o(\beta)) \cos\phi - 2J_1(\beta) \sin\phi \sin w_ot + 2J_2(\beta)$$
$$\cos\phi \cos 2w_ot - \ldots)$$

wherein
  $P_{in}$ is the input optical power from the light source;
  $\phi$ is the Sagnac phase shift;
  $J_n(\beta)$ are Bessel functions with ($\beta$) the frequency modulation index; and
  $\sin w_o t$ the output signal of the signal generator 24.

Figure 2:
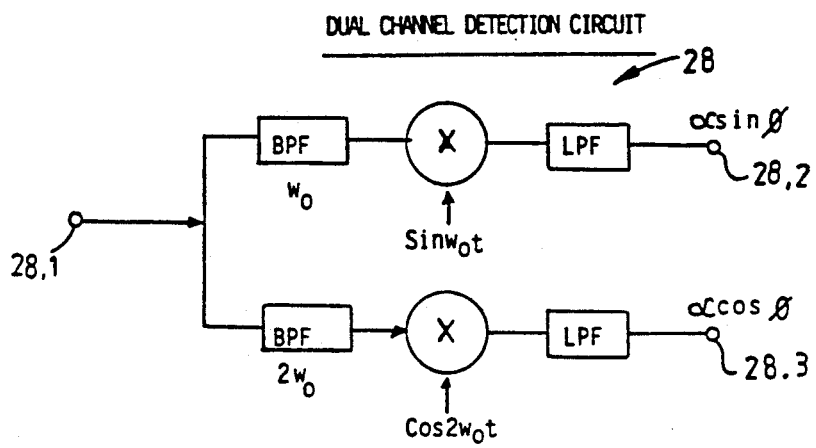
FIG. 2 is a block diagram of a synchronous detection circuit forming part of the apparatus according to the invention.
Figure 3:
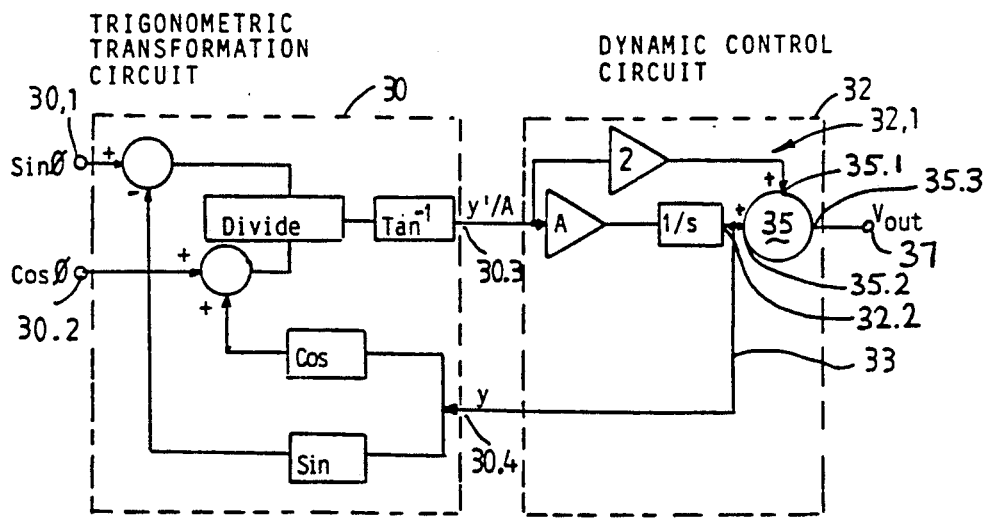
FIGS. 3 to 7 are block diagrams of first to fifth embodiments of trigonometric transformation and control circuitry forming part of the apparatus according to the invention.
Figure 4:
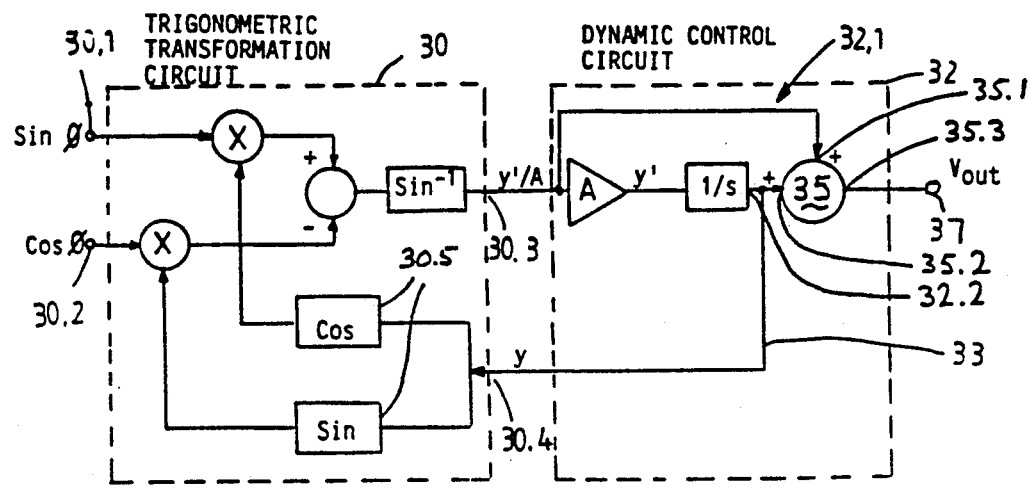
Figure 5:
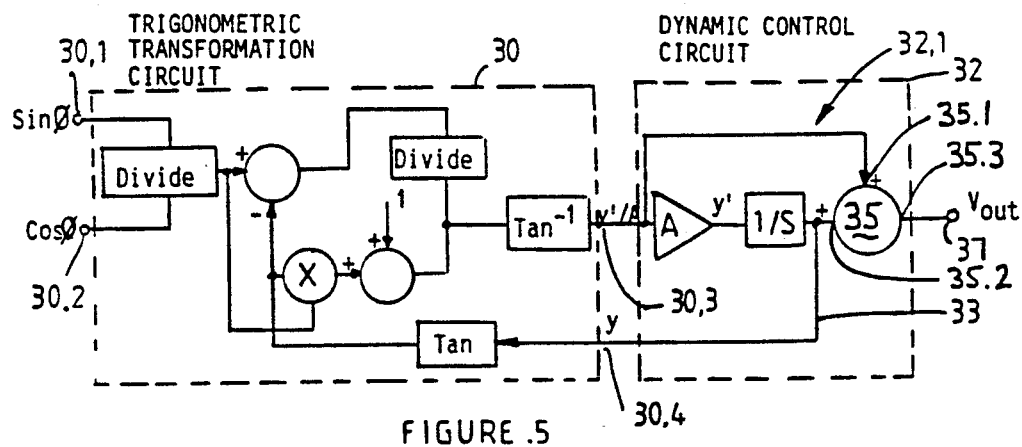
Figure 6:
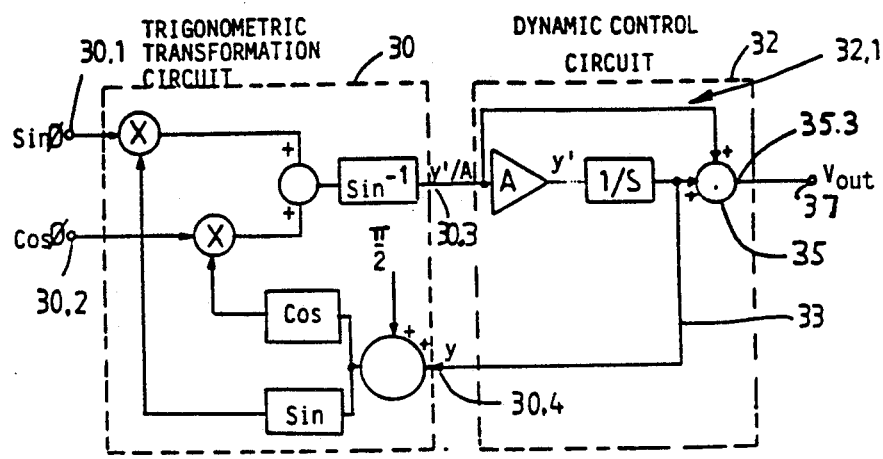
Figure 7:
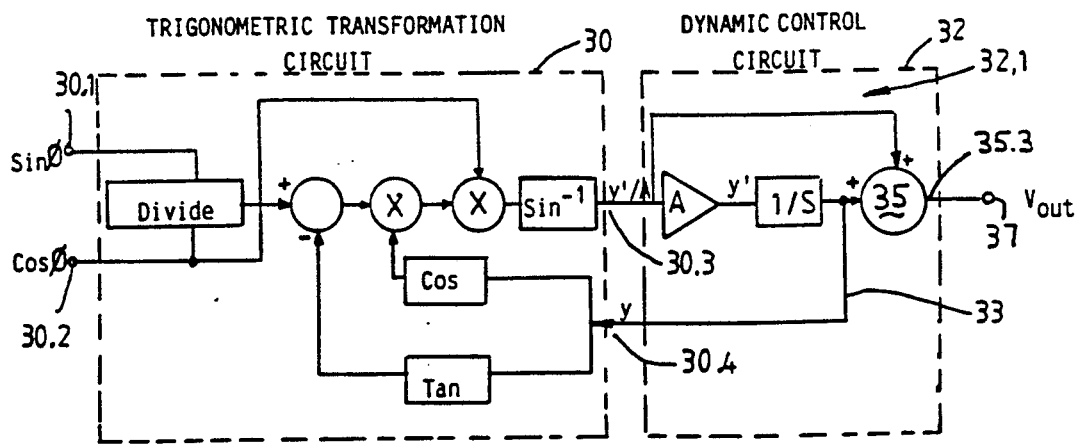

The output of photodetector 26 is fed to the input 28.1 of dual channel synchronous detection circuit 28, shown in more detail in FIG. 2. This circuit provides quadrature signals $\sin\phi$ and $\cos\phi$ at outputs 28.2 and 28.3 thereof, respectively.

As shown in FIG. 1, these non-linear signals are fed to the inputs 30.1 and 30.2 of trigonometric transformation circuit 30, which together with dynamic control circuit 32 linearize the signals.

It has been found that any one of five different transformations, T1 to T5, may be utilized in the trigonometric transformation circuit 30:

$$T1: \arctan\left(\frac{\sin\phi - \sin y}{\cos\phi + \cos y}\right)$$

$$T2: \arcsin(\sin\phi\cos y - \cos\phi\sin y)$$

$$T3: \arctan\left(\frac{\tan\phi - \tan y}{1 + \tan\phi\tan y}\right)$$

$$T4: \arcsin\left(\sin\phi\sin\left(y + \frac{\pi}{2}\right) + \cos\phi\cos\left(y + \frac{\pi}{2}\right)\right)$$

$$T5: \arcsin((\tan\phi - \tan y)\cos\phi\cos y)$$

wherein y is the signal in the feedback loop 33.

The implementation of these transformations are shown in block diagram form in FIGS. 3 to 7, respectively. In these transformation circuits, use is made of commercially available analogue trigonometric function generators, such as the AD 639 sine/cosine generators.

It was found that the transformations T2, T4 and T5 are superior to transformations T1 and T3 where discontinuities occur at input phase angles $\phi$ where the denominator in transformations T1 and T3 equals 0.

The feedforward loop 32.1 in FIGS. 3 to 7 has the effect of reducing the velocity error in the output and to improve the step response, thereby to provide acceptable ramp and step responses. It has also been found that a first order control circuit with a suitable loop gain A and with feedforward loop 32.1 are sufficient to determine the Sagnac phase shift $\phi$ with acceptable ramp and step responses.

Figure 8:
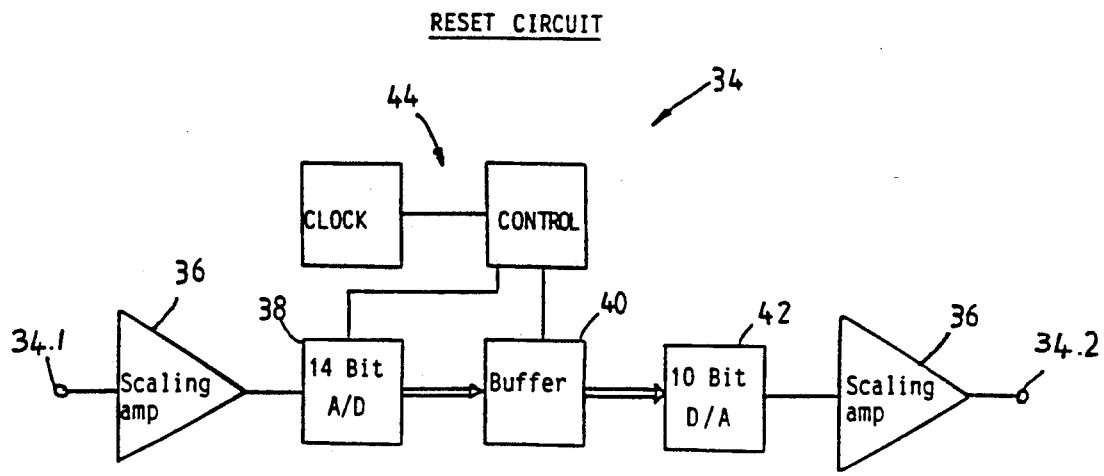
FIG. 8 is a block diagram of a reset circuit also forming part of the apparatus according to the invention.

As indicated hereinbefore, one of the important features of the present invention is the reset circuit shown at 34 in FIGS. 1 and 8. The purpose of this circuit is to enhance the angular range of the system 10 by alleviating the constraints imposed by the aforementioned limited input range of the commercially available analogue trigonometric generators at 30.5 in FIG. 4, for example. These generators, have a limited input range of in the order of $\pm 3\pi$ radians, only. For a gyroscopic with a scale factor of $\phi/\Omega = 10s$, this poses a limitation on the maximum detectable rotation rate $\Omega$ of $\pm 54°/s$.

Figure 11:
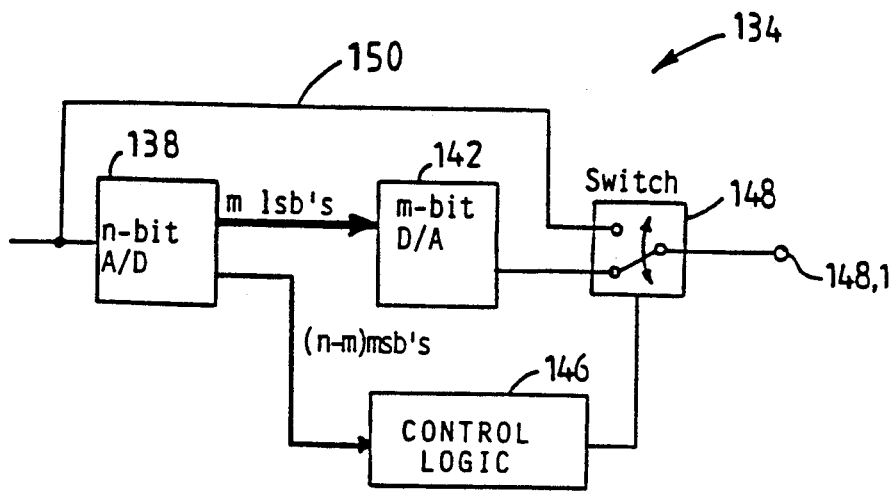
FIG. 11 is a block diagram of an adaptive reset circuit for enhancing the dynamic range of the apparatus.

The reset circuit 34 is based on the fact that sine and cosine are periodical functions with a period of $2\pi$. Thus, by resetting or mapping the signal y at the input of the reset circuit as shown in FIGS. 1, 8 and 11 to vary between values representative of $\pm\pi$ or $\pm 2\pi$ or $\pm 3\pi$, the angular range of the apparatus may be extended.

A presently preferred form of the reset circuit 34 is shown in FIG. 8. The reset circuit comprises scaling amplifiers 36 at the input 34.1 and output 34.2 thereof, a 14-bit analogue to digital (A/D) converter 38 connected to the input amplifier 36, a buffer 40 connected to the A/D converter 38 and a 10-bit digital to analogue (D/A) converter connected to the ten least significant (lsb) bits of the A/D converter via the buffer 40. The output of the D/A converter 42 is connected to the output scaling amplifier which in turn is connected to the cosine and sine generators 30.5 connected to a third input 30.4 of the trigonometric transformation circuit in FIG. 4, for example. A clock and control circuit 44 is also provided to control the operation of the A/D converter 38 and buffer 40.

The maximum possible extension for a circuit of the above kind is given by:

$$\text{Max range extension} = 2^{(n-m)}$$

wherein:
  n is the number of bits in the A/D converter
  m is the number of least significant bits connected to the D/A converter.

Thus, with a 14-bit A/D converter and when utilizing only the ten least significant bits of the D/A converter, the range may be extended with a maximum of 16 times, that is to $\pm 48\pi$ rad. For a gyroscope with a scale factor $\phi/\Omega = 10s$, the maximum detectable rotation rate is $\pm 4,8\pi$ rad/s($\pm 846°/s$ or $\pm 144$ rpm), which is a significant improvement on the maximum range of the known systems.

Figure 9:
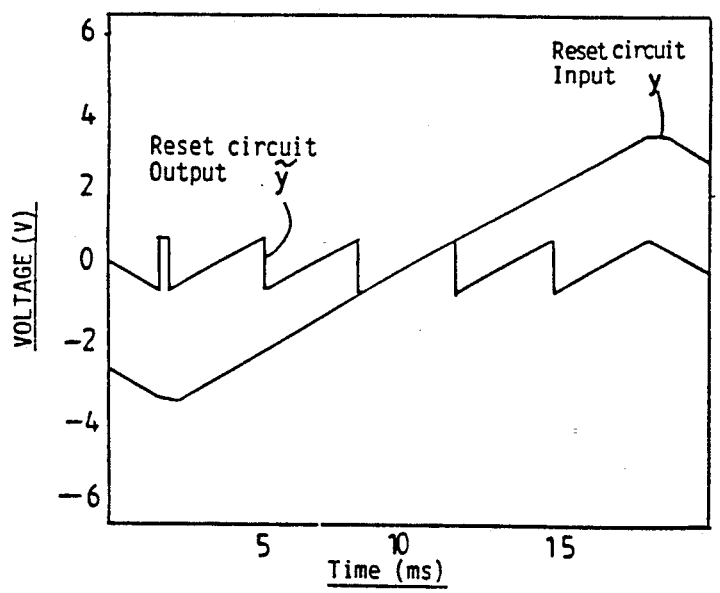
FIG. 9 is a graph of an input signal to the reset circuit and a corresponding signal at the output thereof.
Figure 10:
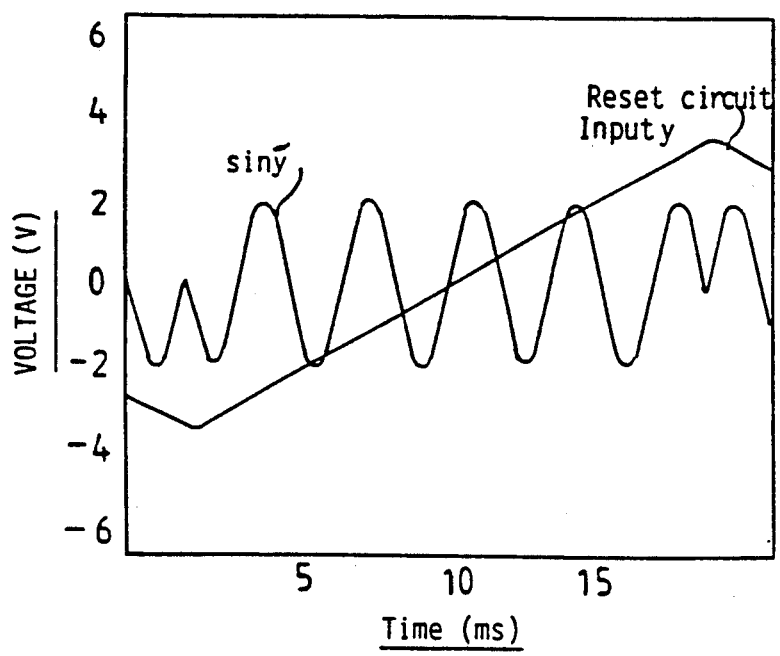
FIG. 10 is a graph of the input signal in FIG. 9 and an output signal of a sine generator connected to the output of the reset circuit.

A typical graph of the input y and output $\bar{y}$ of the circuit in FIG. 8 for a case where the range is extended to $\pm 10\pi$ is shown in FIG. 9. FIG. 10 shows a graph of y and $\sin \bar{y}$ for the same system.

Although the maximum range is extended by orders of magnitude by the implementation of the reset circuit 34, the dynamic range (DR) wherein $$DR = \frac{\text{maximum detectable phase shift}}{\text{minimum detectable phase shift}}$$

would still be limited, since the resolution at small phase shifts would be negatively influenced.

This problem is alleviated by providing an adaptive reset circuit 134 as shown in FIG. 11. The adaptive reset circuit, which, in principle is similar to the reset circuit 34 shown in FIG. 9, comprises a 14-bit A/D converter 138 and a 10-bit D/A converter 142 connected to the ten least significant bits (lsb) of the A/D converter. The four most significant bits (msb) of the A/D converter 138 are connected to control logic 146. An analogue switch 148 is controlled by control logic 146 to provide either the output of the D/A converter 142 at output 148.1 thereof or the signal in the forward loop 150, by-passing both the converters 138 and 142. The control logic 146, via the four most significant bits, monitors the magnitude of the phase shift and thus the rotation rate. It then controls switch 148, at phase shifts falling within the normal range of the cosine and sine generators, to by-pass the reset circuit and to provide the signal at the input of the A/D converter 138 at the output 148.1 thereof. At predetermined upper and lower limit values for the detected phase shift, say $\pm 2\pi$ the control logic 146 causes switch 148 to connect the output of the D/A converter 142 to the output 148.1 thereof. Furthermore, by monitoring the magnitude of the detected phase shift, varying numbers of bits of the D/A converter 142 could be used thereby step-wise increasing the range of the apparatus without decreasing the sensitivity of the apparatus unnecessarily. This system results in a high resolution at small phase shifts while still being able to detect large phase shifts, with the same gyroscope and system. The adaptive reset circuit 134 thus increases the dynamic range of the system since high sensitivity at small phase shifts is retained while increasing the maximum detectable phase shift.

Figure 12:
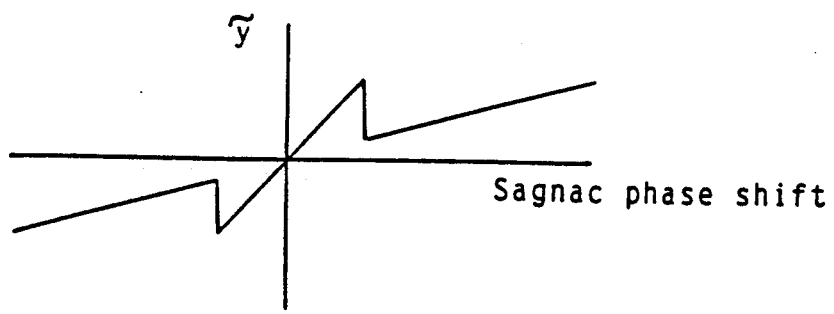
FIG. 12 is a graph of an output of the adaptive reset circuit in FIG. 11 against Sagnac phase shift when the reset circuit is connected into the apparatus.

The change in sensitivity when the switch 148 changes from the signal in the bypass loop 150 to the output of the D/A converter 142 is illustrated graphically in FIG. 12.

It will be appreciated that there are many variations in detail possible on the demodulator and system according to the invention without departing from the scope and spirit of the appended claims.

We claim:

1. Apparatus for providing from two quadrature input signals, which each is a function of a variable, an output proportional to the variable, the apparatus comprising:
    trigonometric transformation means for receiving two quadrature input signals;
    dynamic control means for acting on an output generated by the trigonometric transformation means, the trigonometric transformation means and dynamic control means, in use, co-operating to linearize the two quadrature input signals;
    feedback means provided between said dynamic control means and said trigonometric transformation means;
    adder means; and
    feedforward means provided between said trigonometric transformation means and said adder means;
    the adder means, in use, adding an output generated by the dynamic control means and an output of said feedforward means to provide an output which is proportional to said variable.

2. Apparatus as claimed in claim 1 wherein the trigonometric transformation means comprises means for implementing any one of the following trigonometric transformations:

$T1: \arctan\left(\dfrac{\sin\phi - \sin y}{\cos\phi + \cos y}\right)$ $T2: \arcsin(\sin\phi\cos y - \cos\phi\sin y)$ $T3: \arctan\left(\dfrac{\tan\phi - \tan y}{1 + \tan\phi\tan y}\right)$ $T4: \arcsin\left(\sin\phi\sin\left(y + \dfrac{\pi}{2}\right) + \cos\phi\cos\left(y + \dfrac{\pi}{2}\right)\right)$ $T5: \arcsin((\tan\phi - \tan y)\cos\phi\cos y)$ wherein $\sin\phi$ and $\cos\phi$ are the two quadrature input signals and y is said output generated by the dynamic control means.

3. Apparatus as claimed in claim 1 wherein the dynamic control means is a first order control means.

4. Apparatus as claimed in claim 1 wherein synchronous detection means is provided for providing said quadrature input signals to the trigonometric transformation means.

5. Apparatus as claimed in claim 1 wherein there is provided in the feedback means reset means having input means and an output means, the input means, in use, receiving said output generated by said dynamic control means and said output means of said reset means being connectable to at least one trigonometric function generator in the trigonometric transformation means, the function generator, being adapted to generate a periodic trigonometric function with a fixed period, the reset circuit being operative to reset said output generated by the dynamic control means by subtracting values representative of multiples of said fixed period from said output generated by said dynamic control means, thereby to map said output generated by said dynamic control means within a predetermined limited range of values.

6. Apparatus as claimed in claim 5 wherein the reset means comprises a n-bit analogue to digital (A/D) converter having analogue input means and digital output means comprising n bits; and a at least m-bit digital to analogue (D/A) converter having digital input means comprising at least m bits and analogue output means, the at least m bits of the digital input means of said D/A converter being connected to m least significant bits of the output means of said A/D converter; and wherein m<n.

7. Apparatus as claimed in claim 6 wherein a by-pass loop is provided between the analogue input means of the A/D converter and a first terminal of a switch, a second terminal of the switch being connected to said output means of the D/A converter; and wherein a controller, connected to n-m most significant bits of said output means of said A/D converter, is provided to cause the switch selectively to connect either said first terminal or said second terminal of the switch to said output of said reset means, thereby selectively to bypass the A/D converter and the D/A converter.

8. Apparatus as claimed in claim 1 wherein the trigonometric transformation means comprises a trigonometric transformation circuit having at least first and second input means for receiving the two quadrature input signals and an output means; wherein the dynamic control means comprises a dynamic control circuit connected to the output means of the trigonometric transformation circuit; wherein the feedback means comprises a feedback loop extending from an output means of the dynamic control circuit to a third input means of the trigonometric transformation circuit; wherein the adder means comprises first and second input means and an output means; wherein the feedforward means comprises an input means and an output means, said input means of said feedforward means being connected to said output means of said trigonometric transformation circuit and said output means of said feedforward means being connected to said first input means of said adder means, said second input means of said adder means being connected to said output means of said dynamic control circuit so that, in use, said output proportional to said variable is provided at said output means of said adder means.

9. Apparatus as claimed in claim 8 wherein the trigonometric transformation circuit comprises at least one analogue trigonometric function generator.

10. Apparatus for providing from two quadrature input signals, which each is a function of a variable, an output proportional to the variable, the apparatus comprising:
- trigonometric transformation means for receiving two quadrature input signals;
- dynamic control means for acting on an output of the trigonometric transformation means to generate a dynamic control means output, the trigonometric transformation means and dynamic control means, in use, co-operating to linearize the two quadrature input signals;
- feedback means provided between said dynamic control means and said trigonometric transformation means; and
- reset means having input means and output means provided in the feedback means, the input means, in use, receiving said output generated by said dynamic control means and said output means of said reset means being connectable to at least one trigonometric function generator in the trigonometric transformation means, the function generator being adapted to generate a periodic trigonometric function with a fixed period, the reset circuit being operative to reset said output generated by the dynamic control means by subtracting values representative of multiples of said fixed period from said output generated by said dynamic control means, thereby to map said output generated by said dynamic control means within a predetermined limited range of values.

11. An open-loop fiber optic gyroscope system comprising a light source connected to one port of a first optical fiber coupler, a fiber polarizer connected to a second port of said first optical fiber coupler, one output of said polarizer being connected to a first port of a second optical fiber coupler, a second port of said second fiber optical coupler being connected to a first end of a fiber coil, a second end of said fiber coil being connected via a fiber phase modulator to a third port of said second optical fiber coupler; a photodetector connected to a third port of said first optical fiber coupler; synchronous detection means connected to said photodetector to provide two quadrature signals, which each is a function of a so-called Sagnac phase shift caused by rotation of said fiber coil; trigonometric transformation means for receiving said two quadrature signals; dynamic control means for acting on an output generated by the trigonometric transformation means, the trigonometric transformation means and dynamic control means, in use, co-operating to linearize said two quadrature signals; feedback means provided between said dynamic control means and said trigonometric transformation means; adder means; and feedforward means provided between said trigonometric transformation means and said adder means; the adder means, in use, adding an output generated by the dynamic control means and an output of said feedforward means to provide a system output which is proportional to said Sagnac phase shift.

* * * * *